US008229687B2

(12) United States Patent
Seely et al.

(10) Patent No.: US 8,229,687 B2
(45) Date of Patent: Jul. 24, 2012

(54) SYSTEM AND METHOD FOR MEASURING A LEVEL OF A LIQUID IN A CONTAINER

(75) Inventors: William F. Seely, Taylors, SC (US); Jonathan C. Thatcher, Liberty, SC (US); Steve W. Backman, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 657 days.

(21) Appl. No.: 12/341,171

(22) Filed: Dec. 22, 2008

(65) Prior Publication Data
US 2010/0161252 A1 Jun. 24, 2010

(51) Int. Cl.
*G01F 17/00* (2006.01)
*G01F 23/14* (2006.01)
*G01F 23/00* (2006.01)

(52) U.S. Cl. ............... 702/55; 73/1.73; 73/291; 73/323

(58) Field of Classification Search .............. 702/50, 702/55; 73/149, 290, 716; 60/722, 39.094
See application file for complete search history.

(56) References Cited

U.S. PATENT DOCUMENTS

| 4,394,346 | A | * | 7/1983 | Morooka | 376/258 |
|---|---|---|---|---|---|
| 4,490,105 | A | * | 12/1984 | Hunsberger et al. | 431/65 |
| 4,643,025 | A | * | 2/1987 | Stone | 73/302 |
| 4,716,014 | A | | 12/1987 | Cantineau | |
| 4,896,789 | A | * | 1/1990 | Federspiel | 220/203.17 |
| 5,252,499 | A | * | 10/1993 | Rothschild | 438/475 |
| 5,365,555 | A | | 11/1994 | Sawabe et al. | |
| 5,475,720 | A | * | 12/1995 | Oldenhage et al. | 376/258 |
| 6,252,499 | B1 | * | 6/2001 | Gerdtz et al. | 340/450.2 |
| 6,729,135 | B1 | | 5/2004 | Norris et al. | |
| 2006/0150631 | A1 | * | 7/2006 | Smith et al. | 60/772 |
| 2007/0243434 | A1 | * | 10/2007 | Jahnke et al. | 429/22 |

OTHER PUBLICATIONS

Transactions in Measurement and Control: Flow & Level Measurement, 2001, Putman Publishing Compandy and Omega Press LLC, vol. 4, pp. 76-80.*

* cited by examiner

*Primary Examiner* — Sujoy Kundu
*Assistant Examiner* — Michael Dalbo
(74) *Attorney, Agent, or Firm* — Cantor Colburn LLP

(57) ABSTRACT

An embodiment of the present invention may incorporate a physics based approach (hereinafter "model") to determine the level of the liquid. The model may incorporate the physical properties of the fluids within the container, and measurements of the fluid under consideration. The model may also incorporate data from measuring devices, such as, but not limiting of, a delta-pressure (DP) transmitter. The model may then calculate, within a reasonable level of accuracy, the level of the fluid within the container.

20 Claims, 2 Drawing Sheets

SYSTEM AND METHOD FOR MEASURING A LEVEL OF A LIQUID IN A CONTAINER

BACKGROUND OF THE INVENTION

The present invention relates generally to determining the level of a liquid within a container; more specifically, but not by way of limitation, to an improved system and method of measuring the level of a liquid within a container.

Generally, some processes and systems require an accurate measurement of a fluid within a container. Specifically, some powerplant systems, such as, a liquid fuel system, require an accurate measurement of the level of liquid fuel within a storage tank (hereinafter "container"). The container holding the liquid fuel generally includes an opening, such as a vent, which allows for bubbles entrained in the liquid fuel to escape to the atmosphere. This also allows ambient air to enter the container.

Some known systems use multiple pressure transmitters to measure the level. Here, at least one pressure transmitter is located on the top of the container and another is located on the bottom. The accuracy of this configuration may be inherently low. As such some known systems include a visual indication on the side of the container, to verify the value of the level receive from the pressure transmitters.

For the foregoing reasons, there is a need for an improved system and method of measuring the level of liquid fuel within a container. The system should require less pressure transmitters and level switches. The system should allow a part of the liquid fuel system to be open to the atmosphere. The system should provide an accurate measurement of the level of liquid and not require a visual indication on the container. The overall cost associated with the improved system should be significantly less than that of currently known systems.

BRIEF DESCRIPTION OF THE INVENTION

In accordance with an embodiment of the present invention, a system configured for determining a level of a liquid within a container, the system comprising: a container adapted for holding multiple fluids, wherein the container comprises: a cavity for receiving and discharging the multiple fluids, wherein the cavity comprises: an upper portion, and a lower portion; a reference line for use in determining a level of a liquid within the container, wherein the reference line holds a portion of the liquid; and wherein the reference line is positioned external to the container and is in fluid communication with the container; a bypass line for supplying the reference line with the liquid, wherein the bypass line is in fluid communication with the reference line and with a liquid supply; and a measurement device configured for use in measuring a physical property of the liquid within the container, wherein the measurement device is in fluid communication with both the lower portion of the cavity and the reference line; and a processor for determining the level of the liquid within the cavity, wherein the processor receives data from the measurement device.

In accordance with an alternate embodiment of the present invention, a method of determining a level of a liquid within a container, the method comprising: providing a liquid measurement system, wherein the liquid measurement system comprises: a container adapted for holding multiple fluids, wherein the container comprises: a cavity for receiving and discharging the multiple fluids, and wherein the cavity comprises: an upper portion, and a lower portion; a reference line for use in determining a level of a liquid within the container, wherein the reference line is positioned external to the container and is in fluid communication with the container; a bypass line for supplying the reference line with the liquid, wherein the bypass line is in fluid communication with the reference line and with a liquid supply; and a measurement device configured for use in determining the level of the liquid within the container, wherein the measurement device is in fluid communication with both the lower portion of the cavity and the reference line; and receiving data on a reference height; receiving data on a physical property of the liquid within the container; and determining the level of the liquid within the container.

BRIEF DESCRIPTION OF THE DRAWINGS

These and other features, aspects, and advantages of the present invention will become better understood when the following detailed description is read with reference to the accompanying drawings in which like characters represent like elements throughout the drawings.

DETAILED DESCRIPTION OF THE INVENTION

The following detailed description of preferred embodiments refers to the accompanying drawings, which illustrate specific embodiments of the invention. Other embodiments having different structures and operations do not depart from the scope of the present invention.

Certain terminology is used herein for the convenience of the reader only and is not to be taken as a limitation on the scope of the invention. For example, words such as "upper," "lower," "left," "right," "front", "rear" "top", "bottom", "horizontal," "vertical," "upstream," "downstream," "fore", "aft", and the like; merely describe the configuration shown in the Figures. Indeed, the element or elements of an embodiment of the present invention may be oriented in any direction and the terminology, therefore, should be understood as encompassing such variations unless specified otherwise.

The present invention may determine the level of a fluid, such as, but not limiting of, liquid fuel within a container. An embodiment of the present invention may incorporate a physics based approach (hereinafter "model") to determine the level of the liquid. The model may incorporate the physical properties of the fluids within the container, and measurements of the fluid under consideration. The model may also incorporate data from measuring devices, such as, but not limiting of, a delta-pressure (DP) transmitter. The model may then calculate, within a reasonable level of accuracy, the level of the fluid within the container.

Figure 1:
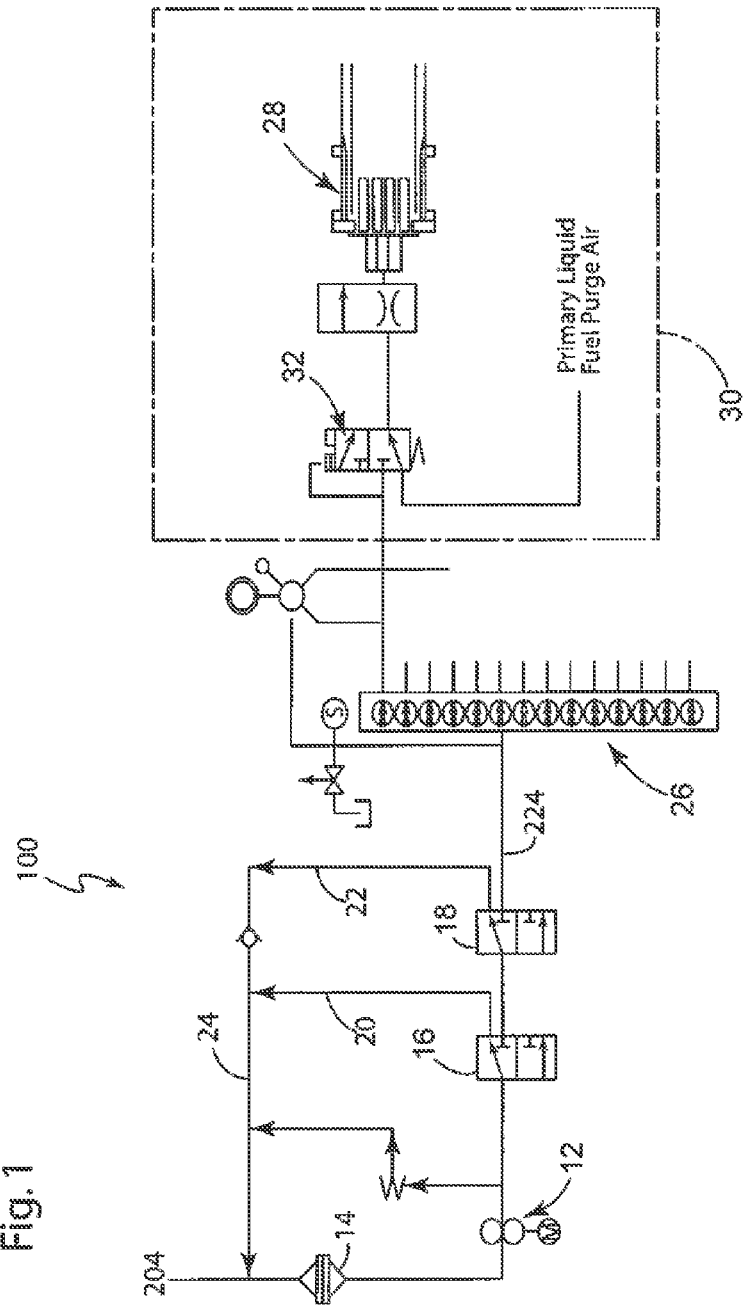
FIG. 1 is a schematic illustrating a known liquid fuel system requiring measurement by an embodiment of the present invention.

Referring now to the Figures, where the various numbers represent like elements throughout the several views FIG. 1 is a schematic illustrating a known liquid fuel system requiring measurement by an embodiment of the present invention. FIG. 1 is a simplified schematic illustrating an embodiment of a conventional liquid fuel system. FIG. 1 illustrates a liquid fuel delivery system 100 integrated with components of a combustion system of a turbomachine. These components are located with box 30, which may generally represent a turbine compartment of a turbomachine.

The fuel delivery system 100 may comprise a fuel pump 12, a filter 14, a bypass control valve 16, a stop valve 18, and a flow distribution device 26. As illustrated, the liquid fuel system begins downstream of the fuel forwarding system connection (not illustrated). During liquid fuel operation, fuel forwarding pumps, of a fuel forwarding system connection, may provide liquid fuel flow through the filters 14 and to the inlet of the fuel pump 12. The fuel pump 12 generally creates positive flow through the bypass control valve 16 and the stop valve 18. FIG. 1 corresponds to a turbomachine operating on natural gas with the liquid fuel on stand-by. Here, the bypass control valve 16 and stop valve 18 are disposed to recirculate any distillate flow through respective lines 20,22 to recirculation line 24.

When the turbomachine is operating on liquid fuel, a portion is diverted to a flow distribution device 26, such as, but not limiting of, a flow divider, which serves to evenly distributes flow to each combustion can 28 (only one of which is illustrated in FIG. 1). Box 30 schematically illustrates components located with a turbine compartment including a combustion can 28 and a three-way valve 32.

When a turbomachine is operating on gas fuel, as illustrated in FIG. 1, the liquid fuel system may remain charged and prepared for a fuel transfer. Here, the liquid fuel system components idle while the control and stop valves 16,18 are in normally closed positions. Purge air, which generally flows at a higher pressure than the static liquid fuel system pressure during gas fuel operation, actuates the three-way valve 32 associated with each combustor (only one of which is illustrated in FIG. 1). This may prevent liquid fuel from entering each combustion can 28.

Figure 2:
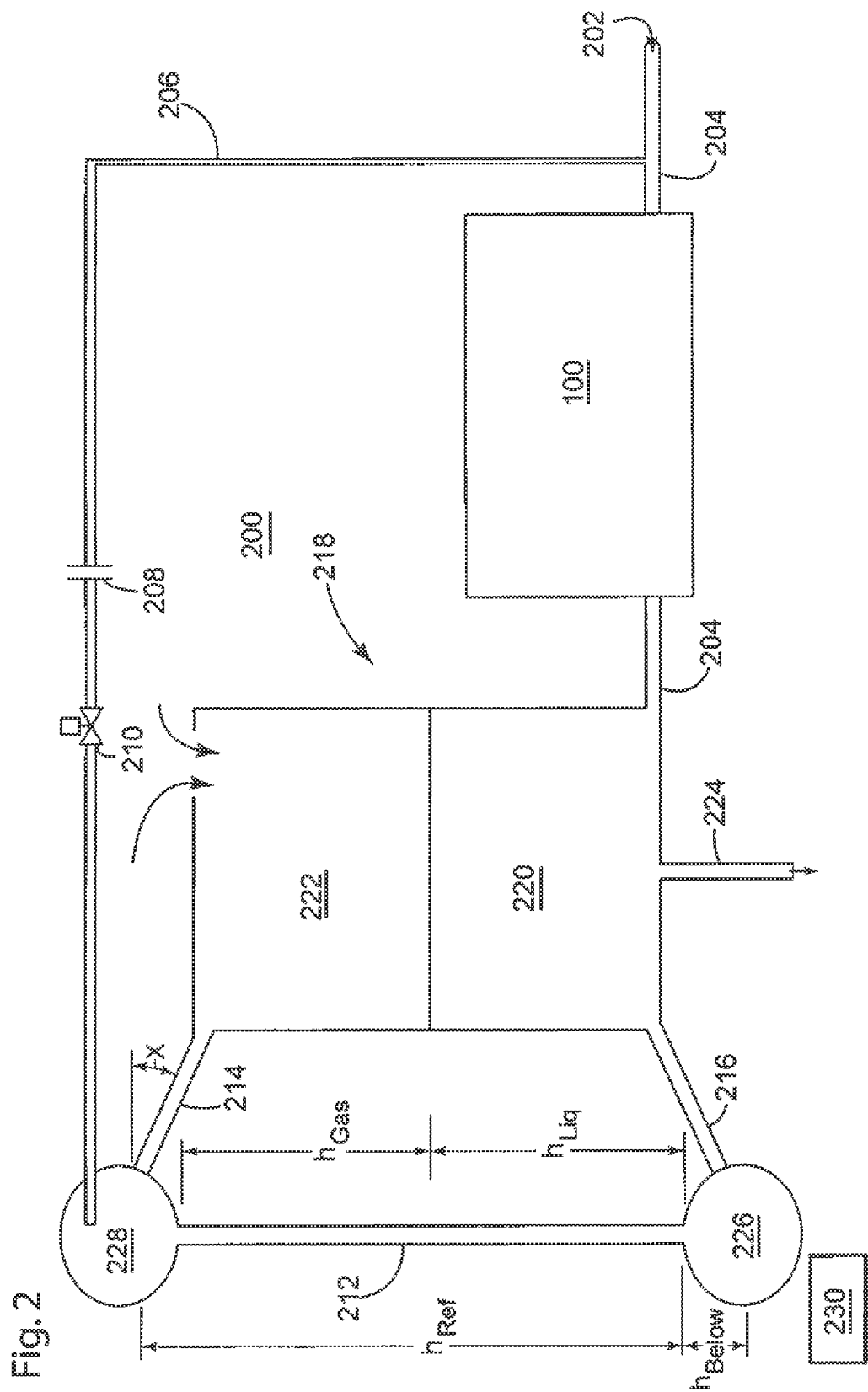
FIG. 2 is a schematic illustrating a liquid measurement system, in accordance with an embodiment of the present invention.

FIG. 2 is a schematic illustrating a liquid measurement system 200, in accordance with an embodiment of the present invention. The liquid measuring system 200 may be a subsystem of the liquid fuel delivery system 100, as illustrated in FIG. 2. As discussed, an embodiment of the present invention may incorporate a model to determine the level of the liquid. The model may incorporate the physical properties of multiples fluids, and measurements of at least one fluid. The model may also incorporate data from measuring devices, such as, but not limiting of, a delta-pressure (dP) transmitter, or the like. The model may then calculate, within a reasonable level of accuracy, the level of the fluid within the container.

An embodiment of the liquid measuring system 200 may be integrated with a liquid fuel delivery system 100, as illustrated in FIG. 2. An embodiment of the liquid measuring system 200 may comprise three main components: A container 218, a reference line 212, and a bypass line 206.

The container 218 may be adapted for holding multiple fluids, such as, but not limiting of, gases, liquids, or combinations thereof. The container 218 may take the form of a storage tank, cylinder, or the like. An internal portion of the container 218 may comprise a cavity that allows for the multiple fluids to engage each other. The cavity may comprise a lower portion 220 and an upper portion 222. Here, the natural separation of the fluids may determine the boundaries of the portions 220, 222. For example, but not limiting of, if the multiple fluids comprise atmospheric air and a liquid fuel, the less dense air may rise to the upper portion 222 and the more dense liquid fuel may settle in the lower portion 220.

An embodiment of the lower portion 220 may receive liquid fuel via a main supply 204, which may also be integrated with a fuel forwarding system connection. The fuel forwarding system connection may receive liquid fuel via a liquid source 202. The lower portion 220 may also include a port for allowing the liquid fuel to exit from the container 218 via the main discharge 224.

An embodiment of the upper portion 222 may allow for the container 218 to receive air from the atmosphere, as indicated by the arrows in FIG. 2. This feature may be quite beneficial for when a liquid fuel is within the lower portion 220. The liquid fuel entering the container 218 may be infused with air bubbles, which is not desired. The upper portion 222 may comprise a vent, or the like, allowing for these air bubbles to exit from the liquid fuel and exit the container 218 into the atmosphere, or the like. The upper portion 222 may receive a relatively small supply of liquid fuel via the overflow line 214, as described below.

The reference line 212 may be considered a "wet-leg". The reference line 212 may provide data for the aforementioned model that will be used to determine the level of fluid within the container. Generally, a wet-leg is used to provide a stable pressure for use in a differential pressure device.

An embodiment of the reference line 212 may be positioned external to the container 218 and be in fluid communication with the container 218. An embodiment of the reference line 212 may be positioned external to the container 218, as illustrated in FIG. 2. Generally, the ends of reference line 212 may extend beyond the height of the container 218, as illustrated in FIG. 2. The reference line 212 may comprise: a measurement device 226, located at a lower end of the reference line 212; and an upper pot 228 located at an upper end of the reference line 212.

The measurement device 226 may comprise: a dP transmitter, a pressure transducer, or combinations thereof. The measurement device 226, in the form of a dP transmitter, may compare the pressure in the reference line 212 and the pressure in the container 218, as illustrated in FIG. 2.

The upper pot 228 may be in fluid communication with the upper portion 222 via an overflow line 214; which may slope down and towards the upper portion 222 at an angle "x". The angle "x" may determine, in part, the height of the liquid within the reference line 212 is a specific height. The specific height may be a height to be maintained a fairly constant level to aid in an accurate wet-leg. The upper pot 228 may also be integrated with a bypass line 206.

The bypass line 206 generally serves to maintain the specific height of the liquid within the reference line 212. The bypass may be considered a drip-line, or the like, having an upstream end connected to the main supply 204. This tap on the main supply 204 may be located upstream of the liquid fuel delivery system 100 and other high pressure drop components, as illustrated in FIG. 2.

An embodiment of the bypass line 206 may comprise at least one orifice 208 and at least one isolation valve 210. The orifice 208 may serve to reduce the effective area of the bypass line 206 in order to achieve desired flow characteristics. The at least one isolation valve 210 may serve to isolate the bypass line 206 from the liquid measuring system 200 during commissioning, maintenance, or the like.

An embodiment of the bypass line 206 may comprise the following features: 1) fabricated of a crush resistant pipe; 2) an inlet portion may be placed far enough upstream such that the liquid pressure is sufficient to overcome the height difference between the inlet and outlet portions of the bypass line 206; 3) the outlet portion of the bypass line 206 faces away from the sloping overflow line 214, to minimize the probability of splash from the incoming liquid fuel flow entering the container 218 and thus preventing the liquid fuel from saturating the reference line 212.

In use, a processor 230 may receive data from the measurement device 226 and execute the model for determining the level of the liquid, such as, but not limiting of, liquid fuel, within the container 218. The model may incorporate the following equation:

$$h_{liq}[in] = \frac{dP[inH_2O] + h_{ref}[in](G_{ref} - G_{gas}) + h_{below}[in](G_{ref} - G_{below})}{(G_{liq} - G_{gas})}$$

where (as illustrated in FIG. 2):
$h_{liq}$: height of the liquid in the container 218;
dP: differential pressure of the liquid fuel a received from the measurement device 226;
$h_{ref}$: height from the top of the measurement device 226 to the point where the slopes ends on the reference line 212;
$G_{ref}$: specific gravity of the reference (liquid fuel);
$h_{below}$: distance between the measurement device 226 begins and where $h_{ref}$ stops:
$G_{below}$: specific gravity of the liquid in the reference line 212;
$G_{liq}$: specific gravity of the liquid in the container 218; and
$G_{gas}$: specific gravity of the gas in the container 218.
N.B.: This equation is adapted to a scenario where the container 218 holds a gas, such as, but not limiting of, ambient air and a liquid such as, but not limiting of, a liquid fuel.

After the model determines the value for the level of the liquid within the container 218 ($h_{liq}$), an embodiment of the present invention may determine within the level is within a preferred range. This range may indicate that the turbomachine is prepared to operate on liquid fuel when required. An embodiment of the model may determine whether the level is outside of the preferred range; and provide an alarm or other notification to alert an operator of a turbomachine. Furthermore, an embodiment of the model may use the processor 230 to control the level of the liquid within the container 218.

Although the present invention has been shown and described in considerable detail with respect to only a few exemplary embodiments thereof, it should be understood by those skilled in the art that we do not intend to limit the invention to the embodiments since various modifications, omissions and additions may be made to the disclosed embodiments without materially departing from the novel teachings and advantages of the invention, particularly in light of the foregoing teachings. Accordingly, we intend to cover all such modifications, omission, additions and equivalents as may be included within the spirit and scope of the invention as defined by the following claims.

What is claimed is:

1. A system configured for determining a level of a liquid within a container, the system comprising:
   a container adapted for holding multiple fluids, wherein the container comprises: a cavity for receiving and discharging the multiple fluids, wherein the cavity comprises: an upper portion, and a lower portion, wherein an area of the upper portion of the cavity allows for ambient air to enter and to exit the cavity;
   a reference line for use in determining a level of a liquid within the container, wherein the reference line holds a portion of the liquid; and wherein the reference line is positioned external to the container and is in fluid communication with the container;
   a bypass line for supplying the reference line with the liquid, wherein the bypass line is in fluid communication with the reference line and with a liquid fuel supply; and
   a measurement device configured for use in measuring a physical property of the liquid within the container, wherein the measurement device is in fluid communication with both the lower portion of the cavity and the reference line; and
   a processor for determining the level of the liquid within the cavity, wherein the processor:
   receives data on a reference height;
   receives data on a physical property of the liquid within the container; and
   uses a model that determines the level of the liquid within the container, wherein the model incorporates data on: the reference height, the physical property of the liquid, the specific gravity of a reference, a specific gravity of the liquid, a specific gravity of an additional fluid, and a distance between the reference height and the measurement device.

2. The system of claim 1, wherein the reference line comprises an upper pot located at an upper end, and the measurement device located at a lower end.

3. The system of claim 2, wherein the reference line comprises an overall length that extends beyond the upper portion and the lower portion of the cavity.

4. The system of claim 2, wherein an overflow line connects the upper pot with the upper portion of the cavity.

5. The system of claim 1, wherein the multiple fluids comprise a liquid fuel and the ambient air.

6. The system of claim 1, wherein the liquid fuel supply is in fluid communication with the container via a first opening, and the measurement device is in fluid communication with the container via a second opening.

7. The system of claim 4, wherein the measurement device comprises at least one of: a delta-pressure transmitter, a pressure transducer, or combinations thereof.

8. The system of claim 1, wherein the bypass line comprises at least one of an isolation valve, an orifice, or combinations thereof.

9. The system of claim 4, wherein the liquid fuel supply delivers the liquid to a bottom of the lower portion of the cavity, and wherein the instrument line is connected near the bottom of the lower portion.

10. The system of claim 4, wherein the bypass fine is connected a top portion of the upper pot.

11. The system of claim 10, wherein the upper pot is located above the container and the overflow line allows for excess liquid to flow into the container when the reference line is at a specific height.

12. The system of claim 11, wherein an angle of the overflow line determines when the liquid with the reference line is at the specific height.

13. The system of claim 1, further comprising a liquid fuel system for delivering a liquid fuel, wherein the liquid fuel system comprises:
   a fuel forwarding system which receives a liquid fuel from the container;
   at least one liquid fuel pump for moving the liquid fuel towards a combustion system, wherein the combustion system comprises a plurality of combustion cans; and at least one device for apportioning the liquid fuel to each of the plurality of combustion cans.

14. A method of determining a level of a liquid within a container, the method comprising:
   operating a liquid measurement system, wherein the liquid measurement system comprises:
   a container adapted for holding multiple fluids, wherein the container comprises: a cavity for receiving and discharging the multiple fluids, and wherein the cavity comprises: an upper portion, and a lower portion, the upper portion having an opening to allow ambient air to pass into and out from the container;
   a reference line for use in determining a level of a liquid within the container, wherein the reference line is positioned external to the container and is in fluid communication with the container;

a bypass line for supplying the reference line with the liquid, wherein the bypass line is in fluid communication with the reference line and with a liquid supply; and a measurement device configured for use in determining the level of the liquid within the container, wherein the measurement device is in fluid communication with both the lower portion of the cavity and the reference line; and operating a processor integrated with the liquid measurement system, wherein the processor:

receives data on a reference height associated with the liquid measurement system;

receives data on a physical property of the liquid within the container of the liquid measurement system; and uses a model that determines the level of the liquid within the container, while a liquid fuel delivery system delivers liquid fuel to a combustion can;

wherein the model incorporates data on: the reference height, the physical property of the liquid, a specific gravity of a reference, a specific gravity of the liquid, a specific gravity of an additional fluid, and a distance between the reference height and the measurement device.

15. The method of claim 14, wherein the multiple fluids comprise a liquid fuel and the ambient air.

16. The method of claim 15, further comprising maintaining the reference line at a specific height.

17. The method of claim 16, wherein the upper pot is located above the container and an overflow line allows for excess liquid to flow into the container when the liquid within the reference line is at the specific height.

18. The method of claim 15, further comprising determining whether the level of the liquid within the container is within a range.

19. The method of claim 18, further comprising providing a notification if the level is outside of the range.

20. The method of claim 18, further comprising controlling the liquid to a specific level within the container.

* * * * *